Patented Feb. 20, 1934

1,947,858

UNITED STATES PATENT OFFICE 1,947,858

PROCESS OF PRODUCING ISOVIOLANTHRONE

Lucas P. Kyrides, Buffalo, N. Y., assignor to National Aniline & Chemical Company, Inc., New York, N. Y., a corporation of New York No Drawing. Application December 1, 1928
Serial No. 323,190

14 Claims. (Cl. 260—61)

This invention relates to the production of isoviolanthrone (isodibenzanthrone—C. I. No. 1103). It relates more particularly to improvements in the preparation of isoviolanthrone by a process comprising the fusion of a Bz-halogen-benzanthrone with caustic alkali in the presence of alcohol, and in the absence of a liquid or liquids as an additional solvent or diluent said improvements comprising the carrying out of the process at temperatures lower than those previously used, and the employment of lesser amounts of alcohol and of caustic alkali relative to the benzanthrone compound than have heretofore been employed.

It has heretofore been proposed to fuse Bz-chlorbenzanthrone at temperatures of about 150° C. in the presence of more than 18 mols each of caustic potash and of anhydrous ethyl alcohol. In carrying out said process the caustic potash and alcohol are heated until the caustic potash is disintegrated, and the clorbenzanthrone is gradually added while heating the mixture. The alcohol which distils from the reaction mixture is collected. At the completion of the reaction, the reaction mass is drowned in water, and the dyestuff is isolated by oxidation and filtration, or by vatting followed by oxidation and filtration.

It has been found, in accordance with the present invention, that in the fusion of Bz-halogen-benzanthrone with caustic alkali and alcohol in the absence of an inert liquid as a solvent or diluent, the process can be carried out much more smoothly, the quantity of dyestuff produced per unit of equipment can be greatly increased, and the yields are not adversely affected, if the proportions of alkali-metal hydroxide and of alcohol employed relative to the Bz-halogen-benzanthrone are decreased to as low as about 5 mols each of alkali-metal hydroxide and of alcohol per mol of benzanthrone compound.

It has furthermore been found, in accordance with the present invention, that if the reaction is carried out under reflux conditions, better temperature control can be obtained, the tendency of the reaction mixture to foam can be decreased, and the benzanthrone compound can be added all at once instead of in small portions as was heretofore done. In addition, the yields obtained are higher and more consistent than those obtained in accordance with the prior process.

It has also been found, that if the fusion mass at the completion of the fusion is diluted with an amount of water not in excess of that required to form with the caustic alkali a concentrated aqueous caustic alkali solution, alcohol of high concentration can be directly obtained by distillation of the diluted fusion mass.

One of the objects of the present invention is the production of isoviolanthrone by a caustic fusion process wherein reduced amounts of caustic alkali are employed in the absence of an inert liquid as a solvent or diluent.

Another object of the present invention is the production of isoviolanthrone by a caustic fusion process wherein reduced amounts of caustic alkali and of alcohol are employed in the absence of an inert liquid as a solvent or diluent.

Another object of the invention is the production of isoviolanthrone by a caustic fusion process wherein temperatures below about 130° C. are employed in the absence of an inert liquid as a solvent or diluent.

Another object of the invention is the production of isoviolanthrone by a caustic fusion process wherein vapors of the reaction ingredients given off during the reaction are condensed and returned to the reaction medium.

These and other objects of the invention will be apparent from a consideration of the following disclosure which is given for the purpose of illustrating the invention.

In carrying out the fusion in accordance with one method of procedure, the Bz-halogen-benzanthrone compound (for example, Bz-chlorbenzanthrone, Bz-brom-benzanthrone, etc.) is heated with from about 5 to about 18 mols, preferably about 6 to about 12 mols, each of caustic potash and of alcohol per mol of Bz-halogen-benzanthrone compound under refluxing conditions at a temperature of about the boiling point of the mixture, or about 110° to about 130° C., and in the absence of an inert liquid as a solvent or diluent. Upon completion of the reaction, water or ice is added in an amount less than or corresponding approximately with that required to form with the potash of the fusion mass a concentrated aqueous potassium hydroxide solution (about 100 to 120% of the weight of the potassium hydroxide used), and the alcohol is distilled off and collected. The remaining mass is then drowned in a relatively large amount of water with agitation, and the dyestuff is recovered by oxidation and filtration, or in any other well-known manner. The alcohol recovered has a strength in excess of 90% and is of such purity that it can be directly employed for a repetition of the process without further treatment. If desired, however, the fusion mass need not be separately treated to recover the alcohol, but the mass can be directly drowned in a relatively large amount of water upon completion of the fusion, and the isoviolanthrone recovered in any well-known manner, as for example, by oxidation and filtration.

The following examples illustrate the invention but it will be understood that the invention is not limited thereto. The parts are by weight.

*Example 1.*—100 parts of potassium hydroxide (86%) and 80 parts of ethyl alcohol (94–96%) are heated together at the boiling point under reflux and agitation until a homogeneous mass results; 70 parts of technical Bz-chlorbenzanthrone, (obtainable, for example, by chlorinating benzanthrone with chlorine in the presence of sulfuric acid) is added; and heating is continued at the boiling point (about 110° C.) with reflux and agitation until the reaction is complete. Upon completion of the reaction (about 5½ hours), the reaction mass is drowned in water with agitation. The isoviolanthrone is isolated and purified in any well known manner, for example, by vatting, oxidizing and filtering, or by directly oxidizing and filtering.

*Example 2.*—67 parts of potassium hydroxide (86%) 53 parts of sodium hydroxide (98%), 120 parts of ethyl alcohol (94–96%) and 60 parts of technical Bz-chlorbenzanthrone are heated together under reflux and agitation at a temperature of about 110° C. until the reaction is substantially complete (about 6 hours). The reaction mass is then cooled to about 50° C., and 80 parts of ice is added. The mass is then heated with agitation to distil off the alcohol, which is collected. 90 parts of alcohol having a constant boiling point of about 78° C. is recovered and can be used in a subsequent fusion. Isoviolanthrone is recovered from the residue by drowning the residue in water, blowing in air, and filtering off the dyestuff, or by vatting the drowned residue, oxidizing and filtering.

It will be understood, as above indicated, that the invention is not limited to the above specific examples, but that various changes may be made within the scope of the claims. Thus, instead of Bz-chlorbenzanthrone, Bz-brom-benzanthrone and their derivatives may be employed. Instead of potassium hydroxide, a mixture of potassium and sodium hydroxides may be employed, or sodium hydroxide may be employed under pressure, and instead of ethyl alcohol other alcohols may be used, such as, propyl alcohol, butyl alcohol, etc. The amount of caustic alkali employed, relative to the benzanthrone compound, may vary from about 5 mols to about 18 mols of potassium hydroxide, or its equivalent of mixed potassium and sodium hydroxides. The amount of alcohol may be correspondingly varied, the minimum amount of alcohol employed being that which is necessary to form with the caustic alkali a mobile mass, or a mass capable of being stirred, under the conditions of the reaction; generally the minimum amount being about a mol of alcohol per mol of caustic alkali. Obviously, larger quantities of alcohol can be used if desired. Temperatures of about 100° C. to about 150° C. may be employed, but temperatures between about 110° C. and about 130° C. are preferred. Furthermore, if desired, the reaction may be carried out under pressure; but operation at about the boiling-point of the mixture and under reflux is preferred. The recovery of the dyestuff from the fusion mass may be carried out in any well known manner.

In addition, it will be understood that where in the claims the term "water" is used, this term includes ice or ice and water mixtures as well as water.

I claim:

1. In the production of isoviolanthrone by the fusion of a Bz-halogen-benzanthrone compound with an alcohol and an alkali-metal hydroxide in the absence of an inert liquid as a solvent or diluent, the improvement which comprises carrying out the reaction with a reaction mixture containing about 5 to about 18 mols of alkali-metal hydroxide per mol of halogen-benzanthrone compound.

2. In the production of isoviolanthrone by the fusion of a Bz-halogen-benzanthrone compound with an alcohol and an alkali-metal hydroxide in the absence of an inert liquid as a solvent or diluent, the improvement which comprises heating at a temperature of about 100°–150° C., a reaction mixture comprising the Bz-halogen-benzanthrone compound, the alkali-metal hydroxide and the alcohol in the proportions of about 5 to about 18 mols of alkali-metal hydroxide per mol of halogen-benzanthrone compound.

3. In the production of isoviolanthrone by the fusion of a Bz-halogen-benzanthrone compound with an alcohol and an alkali-metal hydroxide in the absence of an inert liquid as a solvent or diluent, the improvement which comprises refluxing at its boiling point, a reaction mixture comprising the Bz-halogen-benzanthrone compound, the alkali-metal hydroxide and the alcohol in the proportion of about 5 to about 18 mols of alkali-metal hydroxide per mol of halogen-benzanthrone compound.

4. In the production of isoviolanthrone by the fusion of a Bz-halogen-benzanthrone compound with alcohol and an alkali-metal hydroxide in the absence of an inert liquid as a solvent or diluent, the improvement which comprises heating at a temperature of about 110°–130° C., a reaction mixture comprising a Bz-halogen-benzanthrone compound, potassium hydroxide and ethyl alcohol in the proportion of about 6 to about 12 mols of potassium hydroxide per mol of Bz-halogen-benzanthrone compound.

5. In the production of isoviolanthrone by the fusion of a Bz-halogen-benzanthrone compound with alcohol and an alkali-metal hydroxide in the absence of an inert liquid as a solvent or diluent, the improvement which comprises refluxing at its boiling point a reaction mixture comprising a Bz-halogen-benzanthrone compound, potassium hydroxide and ethyl alcohol in the proportion of about 6 to about 12 mols of potassium hydroxide per mol of Bz-halogen-benzanthrone compound.

6. In the production of isoviolanthrone by the fusion of a Bz-halogen-benzanthrone compound with an alcohol and an alkali-metal hydroxide in the absence of an inert liquid as a solvent or diluent, the improvement which comprises refluxing at its boiling point, a reaction mixture comprising a Bz-halogen-benzanthrone compound, potassium hydroxide and ethyl alcohol in the proportion of about 6 mols of potassium hydroxide per mol of halogen-benzanthrone compound.

7. In the production of isoviolanthrone by the fusion of a Bz-halogen-benzanthrone compound with an alcohol and an alkali-metal hydroxide in the absence of an inert liquid as a solvent or diluent, the improvement which comprises refluxing at its boiling point, a reaction mixture comprising a Bz-halogen-benzanthrone compound, an alkali-metal hydroxide and a saturated aliphatic monohydric alcohol in the proportions of about 5 to about 18 mols of alkali-metal hydroxide and about 5 to about 18 mols of alcohol per mol of halogen-benzanthrone compound.

8. In the production of isoviolanthrone by the fusion of a Bz-halogen-benzanthrone compound with alcohol and potassium hydroxide in the absence of an inert liquid as a solvent or diluent, the improvement which comprises refluxing at its boiling point, a reaction mixture comprising a Bz-halogen-benzanthrone compound, potassium hydroxide and ethyl alcohol in the proportions of about 6 to about 12 mols of potassium hydroxide and about 6 to about 12 mols of ethyl alcohol per mol of Bz-halogen-benzanthrone compound.

9. In the production of isoviolanthrone by the fusion of Bz-chlorbenzanthrone with alcohol and potassium hydroxide in the absence of an inert liquid as a solvent or diluent, the improvement which comprises refluxing at its boiling point a reaction mixture comprising Bz-chlorbenzanthrone, potassium hydroxide and ethyl alcohol in the proportions of about 6 mols of potassium hydroxide and not less than about 6 mols of ethyl alcohol per mol of chlorbenzanthrone.

10. In the production of isoviolanthrone by the fusion of a Bz-halogen-benzanthrone compound with an alcohol and an alkali-metal hydroxide, the improvement which comprises carrying out the reaction with a reaction mixture comprising a Bz-halogen-benzanthrone compound, an alkali-metal hydroxide and a saturated aliphatic monohydric alcohol in the proportion of about 5 to about 18 mols of alkali-metal hydroxide per mol of halogen-benzanthrone compound, diluting the resulting fusion mass with an amount of water not in excess of that required to form a concentrated aqueous caustic alkali solution, and distilling the alcohol from said diluted fusion mass.

11. In the production of isoviolanthrone by the fusion of Bz-chlorbenzanthrone with alcohol and potassium hydroxide, the improvement which comprises carrying out the reaction with a reaction mixture comprising Bz-chlorbenzanthrone, potassium hydroxide and ethyl alcohol in the proportions of about 6 to about 12 mols of potassium hydroxide per mol of Bz-chlorbenzanthrone, diluting the resulting fusion mass with an amount of water not in excess of that required to form a concentrated aqueous potassium hydroxide solution, and distilling ethyl alcohol from said diluted fusion mass.

12. In the production of isoviolanthrone by the fusion of Bz-chlorbenzanthrone with alcohol and potassium hydroxide, the improvement which comprises carrying out the reaction with a reaction mixture comprising Bz-chlorbenzanthrone, potassium hydroxide and ethyl alcohol in the proportions of about 6 to about 12 mols of potassium hydroxide and about 6 to about 12 mols of ethyl alcohol per mol of Bz-chlorbenzanthrone, diluting the resulting fusion mass with an amount of ice not in excess of that required to form a concentrated aqueous potassium hydroxide solution, distilling ethyl alcohol from said diluted fusion mass, and collecting the distillate.

13. In the production of isoviolanthrone by the fusion of a Bz-halogen-benzanthrone compound with an alcohol and an alkali-metal hydroxide, the improvement which comprises refluxing at its boiling point a reaction mixture comprising a Bz-halogen-benzanthrone compound, an alkali-metal hydroxide and a saturated aliphatic monohydric alcohol in the proportion of about 5 to about 18 mols of alkali-metal hydroxide per mol of halogen-benzanthrone compound, adding water to the resulting fusion mass in an amount corresponding to about 100 to 120 per cent. by weight of the alkali-metal hydroxide employed, distilling the alcohol from the resulting mixture, and collecting the distillate.

14. In the production of isoviolanthrone by the fusion of Bz-chlorbenzanthrone with alcohol and potassium hydroxide in the absence of an inert liquid as a solvent or diluent, the improvement which comprises refluxing at a temperature of about 110°–130° C. a reaction mixture comprising Bz-chlorbenzanthrone, potassium hydroxide and ethyl alcohol in the proportions of about 6 to 12 mols of potassium hydroxide and about 6 to 12 mols of ethyl alcohol per mol of Bz-chlorbenzanthrone, cooling the resulting mixture at the completion of the reaction to about 50° C., adding ice in an amount corresponding to about 100 to 120 per cent. by weight of the potassium hydroxide employed, and distilling and collecting ethyl alcohol from the resulting mixture.

LUCAS P. KYRIDES